(12) United States Patent
Wu et al.

(10) Patent No.: US 7,636,926 B2
(45) Date of Patent: Dec. 22, 2009

(54) SHOCK ISOLATION STRUCTURE APPLIED IN OPTICAL DISC DRIVE

(75) Inventors: Jen-Chen Wu, Yunlin (TW); Chen-Fu Chang, Tainan (TW)

(73) Assignee: Quanta Storage Inc., Toa Yuan Shien (TW)

( * ) Notice: Subject to any disclaimer, the term of this patent is extended or adjusted under 35 U.S.C. 154(b) by 932 days.

(21) Appl. No.: 11/157,831

(22) Filed: Jun. 22, 2005

(65) Prior Publication Data

US 2006/0294533 A1  Dec. 28, 2006

(51) Int. Cl.
*G11B 33/08* (2006.01)
(52) U.S. Cl. ..................................... 720/692
(58) Field of Classification Search ........................ None
See application file for complete search history.

(56) References Cited

U.S. PATENT DOCUMENTS 5,737,304 A * 4/1998 Soga et al. .................. 720/692
6,125,097 A * 9/2000 Wu ............................. 720/692
6,823,527 B2 * 11/2004 Liao et al. .................... 720/692
6,883,175 B2 * 4/2005 Liao et al. .................... 720/692
7,243,359 B2 * 7/2007 Saito et al. ................... 720/692

* cited by examiner

*Primary Examiner*—Mark Blouin
(74) *Attorney, Agent, or Firm*—Birch, Stewart, Kolasch & Birch, LLP

(57) ABSTRACT

A shock isolation structure applied in an optical disc drive is provided. The shock isolation structure includes a bottom portion, a top portion, and a neck portion jointing the bottom portion and the top portion. The portions have a through hole running through the top surface of the top portion and the bottom surface of the bottom portion along a run-through central line. In the neck portion, any ring-shaped cross section using the run-through central line as the normal has a first wall thickness on a first extension line starting from the run-through central line and extending towards the outer peripheral of the ring-shaped cross section, and has a second wall thickness on a second extension line starting from the run-through central line and extending towards the outer peripheral of the ring-shaped cross section. The first wall thickness is larger than the second wall thickness.

22 Claims, 16 Drawing Sheets

SHOCK ISOLATION STRUCTURE APPLIED IN OPTICAL DISC DRIVE

This application incorporates by reference Taiwanese application Serial No. 93112093, filed Apr. 29, 2004.

BACKGROUND OF THE INVENTION

1. Field of the Invention

The invention relates in general to a shock isolation structure applied in an optical disc drive, and more particularly to a shock isolation structure applied in an optical disc drive which effectively isolates external impact when the optical disc drive is under horizontal installation or vertical installation.

2. Description of the Related Art

With the wide application of pictures, movies, music and computer software, high capacity optical disc has become an important software carriage to people living in today's society where science and technology are advancing rapidly. The optical disc, which can be further divided into CD and DVD, are widely used and beloved due to their features of large capacity, small size and safety in data storage. Therefore, the optical disc drive which can read the CD and DVD also becomes an essential piece of the equipment of a personal computer.

Referring to FIG. 1, an exploded 3-D diagram of a conventional optical disc drive with shock isolation structure is shown. In FIG. 1, the optical disc drive 10 includes a base 11, a traverse 12 and four shock isolation structures 13. The shock isolation structure 13 applied in an optical disc drive is disposed between the base 11 and the traverse 12 has a through hole 13a. The base 11 has four sleeve columns 14 received in the through hole 13a. The sleeve column 14 has a screw hole 14a for a screw 15 to be screwed into from the opening of one end of the through hole 13a when the shock isolation structure 13 is mounted on the sleeve column 14. The traverse 12 has four traverse's extension portions 12a. The embedding aperture of the traverse's extension portion 12a is for the shock isolation structure 13 to be embedded into. The optical disc drive 10 further includes a spindle motor 12b disposed on the traverse 12 for rotating an optical disc.

As shown in FIGS. 2A-2B, the shock isolation structure 13 at least includes a bottom portion 13b, a neck portion 13c and a top portion 13d. The neck portion 13c joints the bottom portion 13b and the top portion 13d. The bottom portion 13b, the neck portion 13c and the top portion 13d have a through hole 13a. The through hole 13a runs through the top surface of the top portion 13d and the bottom surface of the bottom portion 13b along the z-direction. The neck portion 13c is embedded into the embedding aperture of the traverse's extension portion 12a, so that the shock isolation structure 13 can moveably support the traverse 12 as shown in FIG. 2C.

Referring to FIG. 2B again, in the neck portion 13c, the outer peripheral 17a and the inner peripheral 17b of any of the ring-shaped cross-sections 17 using the z-direction as the normal form two concentric circles. The ring-shaped cross section 17 has a wall thickness K on the path starting from the circular center O2 and extending along the x-direction. The ring-shaped cross section 17 also has a wall thickness K on the path starting from circular center O2 and extending along the y-direction. Therefore, the neck portion 13c of the shock isolation structure 13 has a wall thickness K on any direction perpendicular to the z-direction.

Due to the differences of design and application, the optical disc drive can be installed in a computer according to horizontal installation or vertical installation. Suppose the optical disc drive 10 of FIG. 2C uses the x-direction as the gravity direction and adopts vertical installation. The neck portion 13c of the shock isolation structure 13 has an even wall thickness K, so the shock isolation structure 13 is incapable of providing a better shock isolation, resulting in a poor shock isolating performance against external impact. Worse than that, the wall thickness of the neck portion 13c along the x-direction would have a large deformation after receiving the external impact, causing the wall thickness of the neck portion 13c along the x-direction to be reduced, severely affecting the shock isolating ability of the shock isolation structure 13.

As shown in FIG. 3, the optical disc drive 10 further includes a tray 12c for carrying the optical disc 19 to enter or leave the optical disc drive 10 along the y-direction. When the optical disc drive 10 uses the x-direction as the gravity direction and adopts vertical installation, the gravity direction of the traverse 12 is the x-direction. The direction of the x-axis of the shock isolation structure 13 of FIG. 1 is easily distorted, causing the center of the optical disc 19 to shift downwardly for a distance of D. Consequently, the lower edge of the optical disc 19 would scrap the tray 12c and the base 11 when the optical disc 19 is rotated by the spindle motor 12b of FIG. 1. Besides, in order to isolate the external impact, the shock isolation structure 13 is normally designed to be very soft. When the horizontally installed optical disc drive 10 receives a larger external impact, the optical disc 19 would easily vibrate up and down. Under such circumstances, the optical disc 19 is more likely to scrap the bearing surface of the tray 19.

SUMMARY OF THE INVENTION

It is therefore an object of the invention to provide a shock isolation structure applied in an optical disc drive. The wall thickness along the first direction is designed to be larger than the wall thickness along the second direction, not only reducing the deformation which would occur to the wall thickness along the first direction when receiving an external impact, but also enabling the optical disc drive under vertical installation to better isolate the external impact. The design of a positioning rib facilitates the user or the operator to more clearly differentiate the installation direction of the shock isolation structure when assembling the shock isolation structure into the optical disc drive. According to the change in the appearance of the shock isolation structure, when the optical disc drive is functioning under vertical installation, the lower edge of the optical disc can be prevented from touching the tray and the base without increasing any manufacturing costs. The design of having the vertical rib be disposed under the extension of the traverse limits the shift of the traverse towards the base when an optical disc rotated in an optical disc drive under horizontal installation receives a large external impact, thus preventing the optical disc in rotation from touching the bearing surface of the tray. The shock isolation structure according to the invention can be applied to at least an optical disc drive under horizontal or vertical installation. The function of shock isolation can be achieved under either installation.

According to an object of the invention, a shock isolation structure applied in an optical disc drive including a bottom portion, a top portion and a neck portion jointing the bottom portion and the top portion is provided. The bottom portion, the neck portion and the top portion have a through hole. The through hole runs through the top surface of the top portion and the bottom surface of the bottom portion along a run-through central line. In the neck portion, any ring-shaped cross section using the run-through central line as the normal has a first wall thickness on a first extension line starting from a run-through central line and extending towards the outer peripheral of the ring-shaped cross section, and has a second wall thickness on a second extension line starting from the run-through central line and extending towards the outer peripheral of the ring-shaped cross section. The first wall thickness is larger than the second wall thickness.

According to another object of the invention, an optical disc drive including a base, a traverse and a shock isolation structure applied in an optical disc drive is provided. The base has a sleeve column. The traverse has an embedding aperture. The shock isolation structure includes a bottom portion, a top portion and a neck portion jointing the bottom portion and the top portion. The bottom portion, the neck portion and the top portion have a through hole. The through hole runs through the top surface of the top portion and the bottom surface of the bottom portion along a run-through central line. The through hole receives the sleeve column. The neck portion is embedded into the embedding aperture. In the neck portion, any ring-shaped cross section using the run-through central line as the normal has a first wall thickness on a first extension line starting from a run-through central line and extending towards the outer peripheral of the ring-shaped cross section, and has a second wall thickness on a second extension line starting from the run-through central line and extending towards the outer peripheral of the ring-shaped cross section. The first wall thickness is larger than the second wall thickness.

Other objects, features, and advantages of the invention will become apparent from the following detailed description of the preferred but non-limiting embodiments. The following description is made with reference to the accompanying drawings. Anyone who is skilled in related technology would be able to understand and implement the technology accordingly.

DETAILED DESCRIPTION OF THE INVENTION

Embodiment One

Figure 1:
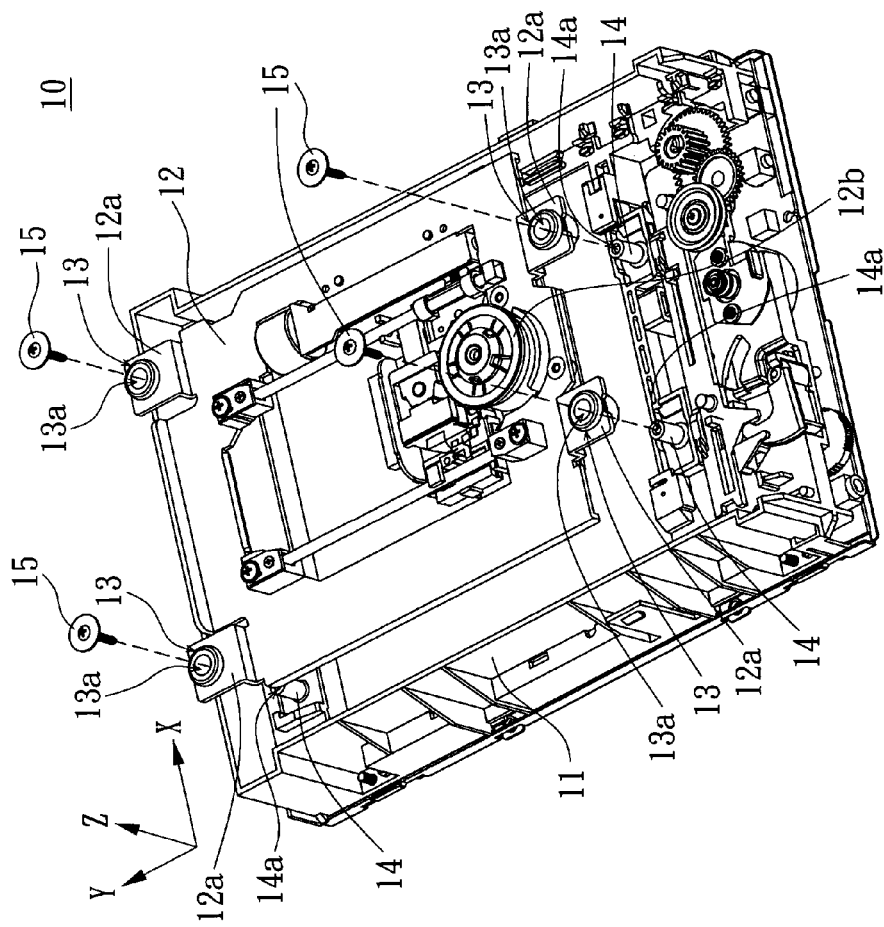
FIG. 1 (Prior Art) is an exploded 3-D diagram of a conventional optical disc drive with shock isolation structure.
Figure 2A:
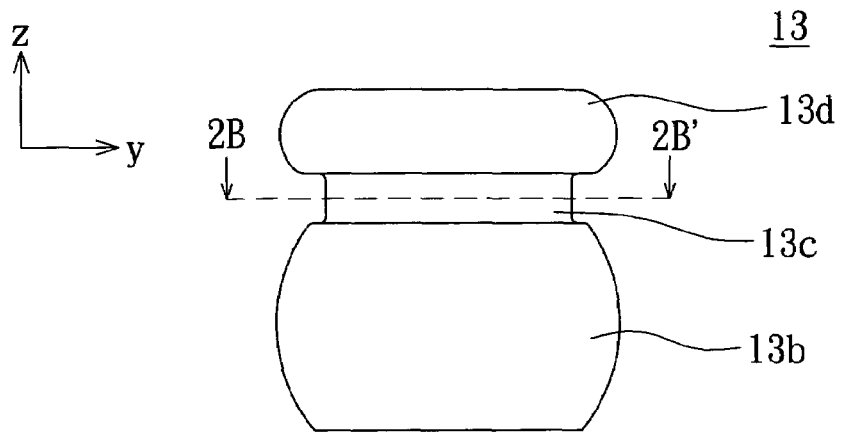
FIG. 2A (Prior Art) is an enlarged side view of the shock isolation structure applied in the optical disc drive of FIG. 1A.
Figure 2B:
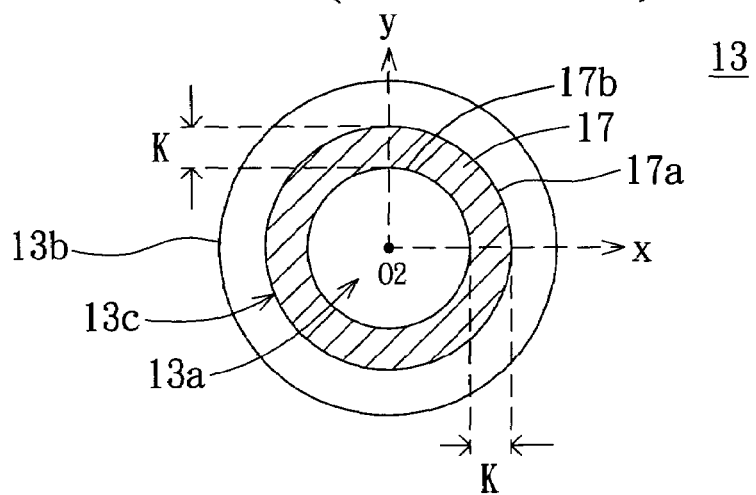
FIG. 2B (Prior Art) is a diagram of the shock isolation structure applied in the optical disc drive viewed along the cross-sectional line 2B-2B' of FIG. 2A.
Figure 2C:
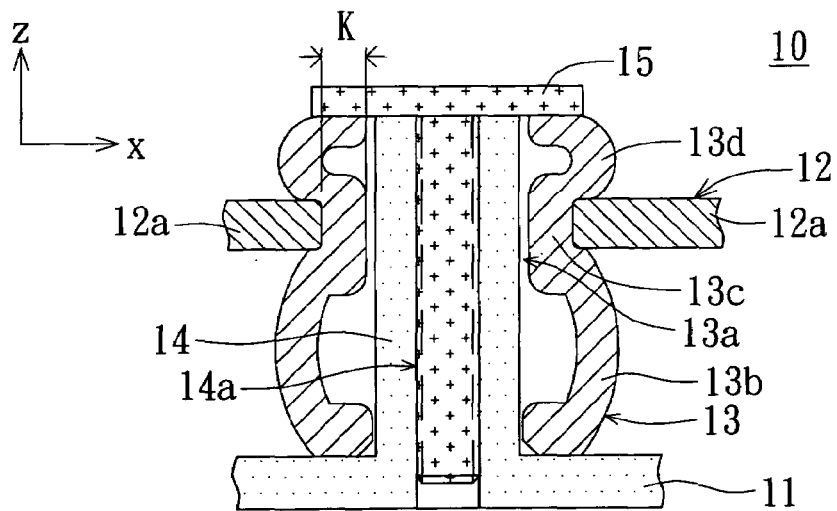
FIG. 2C (Prior Art) is an enlarged sectional view of assembly of the shock isolation structure applied in the optical disc drive, the sleeve column and the screw of FIG. 1A when using the xz-plane as the sectional plane and viewed from the y-direction.
Figure 3:
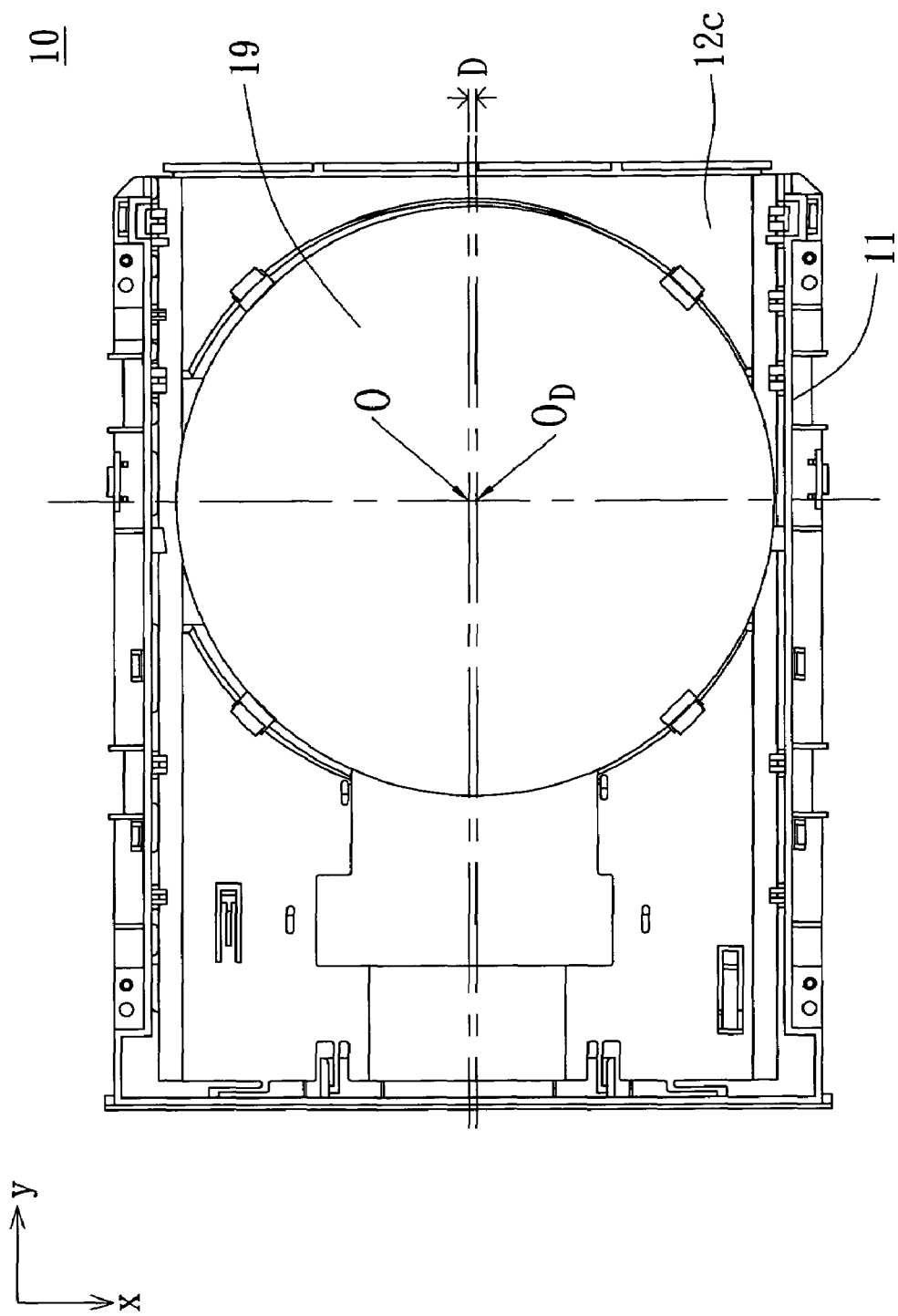
FIG. 3 (Prior Art) is a diagram showing the edge of the optical disc scraps the tray and the base when the optical disc drive of FIG. 1A is under vertical installation.
Figure 4A:
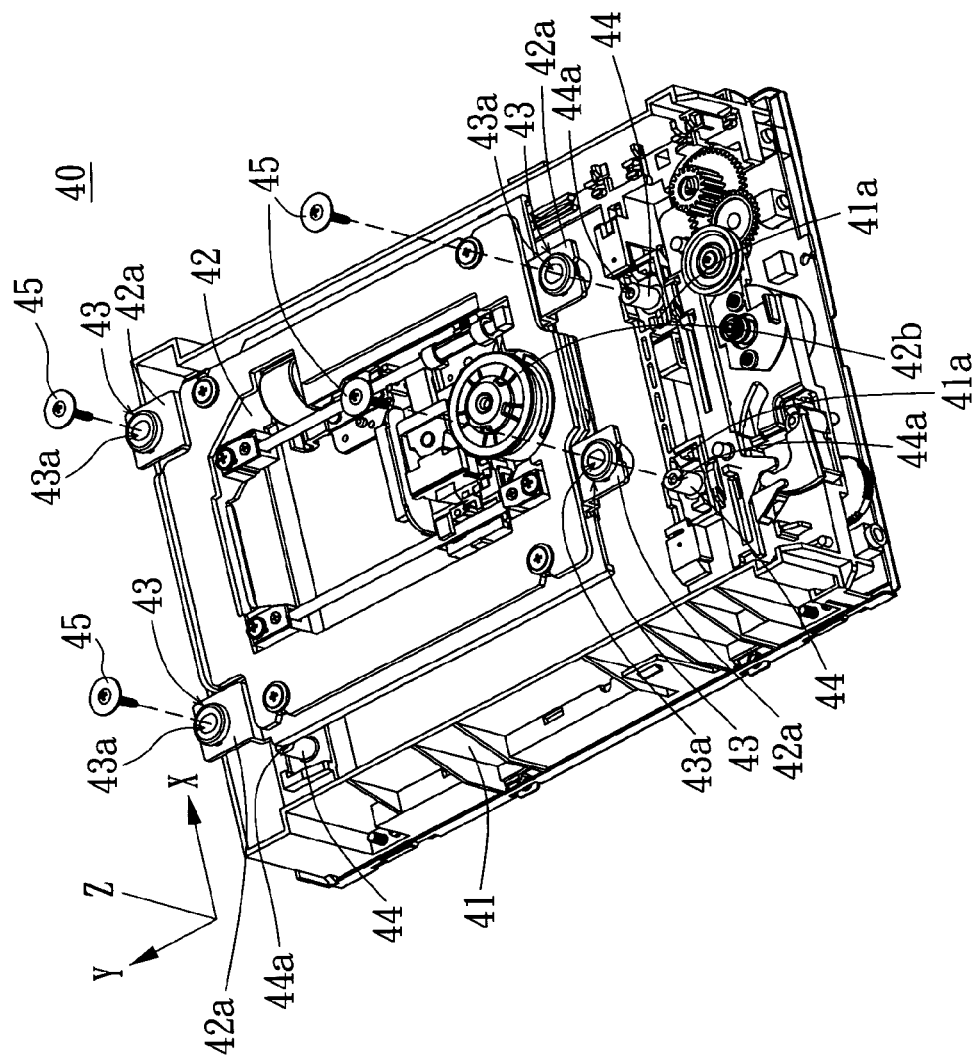
FIG. 4A is an exploded 3-D diagram of part of the optical disc drive with shock isolation structure according to embodiment one of the invention.
Figure 4B:
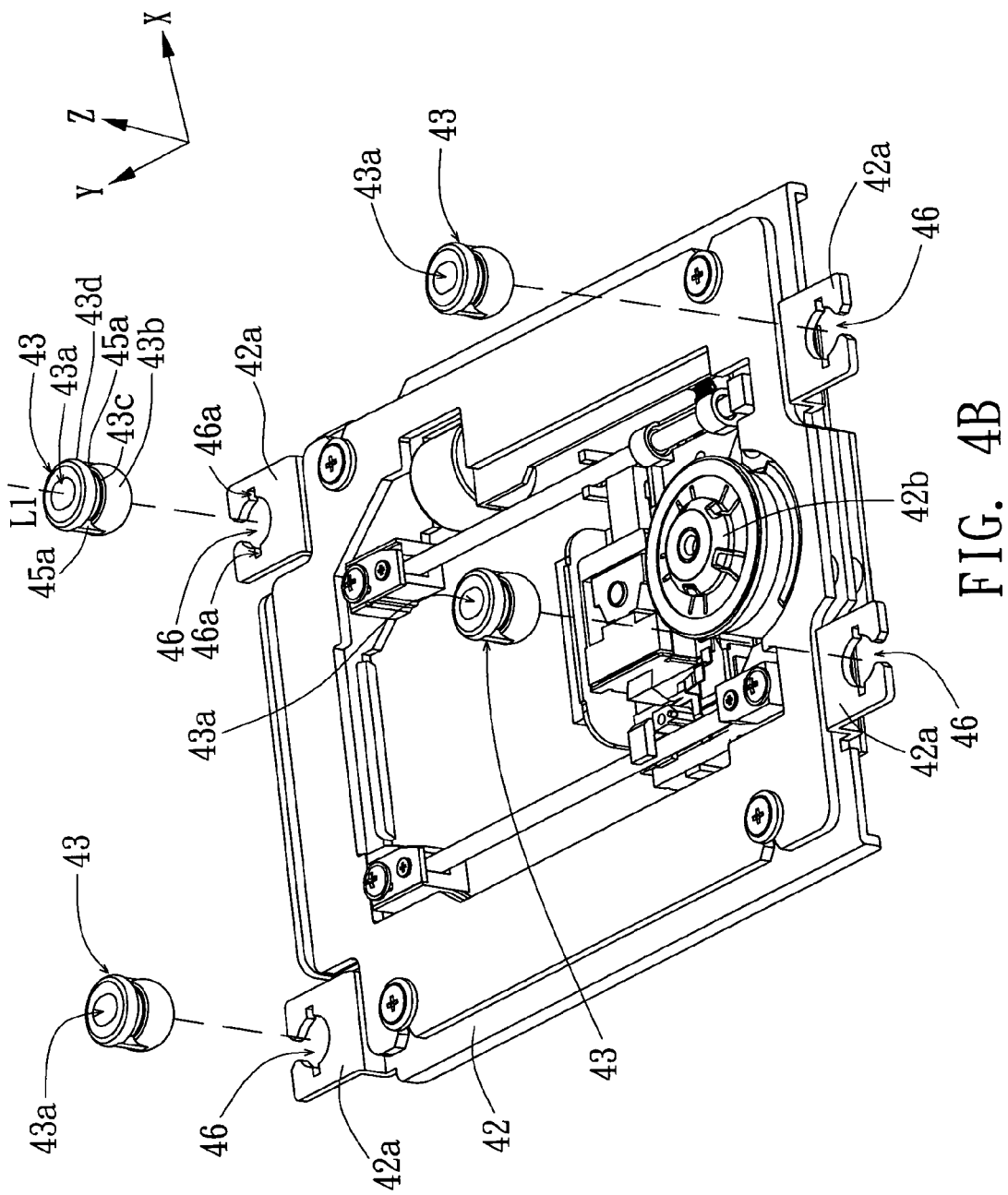
FIG. 4B is an exploded enlarged 3-D diagram of the traverse and the shock isolation structure applied in the optical disc drive of FIG. 4A.
Figure 4C:
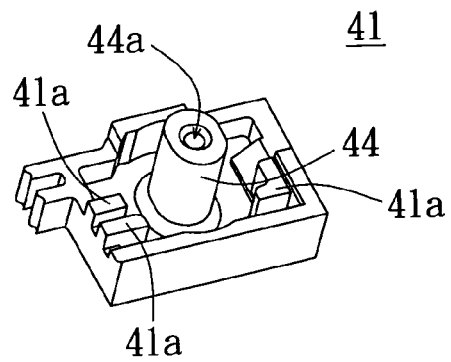
FIG. 4C and FIG. 4D are two enlarged 3-D diagrams of the sleeve column and the vertical rib of FIG. 4A.
Figure 4D:
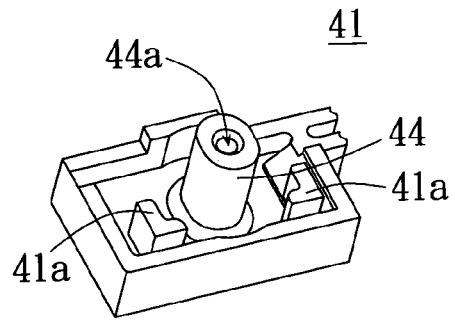

Referring to FIG. 4A and FIG. 4B, FIG. 4A is an exploded 3-D diagram of part of the optical disc drive with shock isolation structure according to embodiment one of the invention, while FIG. 4B is an exploded enlarged 3-D diagram of the traverse and the shock isolation structure applied in optical disc drive of FIG. 4A. In FIG. 4A and FIG. 4B, the optical disc drive 40 includes a base 41, a traverse 42 and at least a shock isolation structure 43. The shock isolation structure 43 applied in an optical disc drive is disposed between the base 41 and the traverse 42 has a through hole 43a. The base 41 has at least a sleeve column 44 for receiving the through hole 43a, so that the shock isolation structure 43 is mounted on the base 41. Besides, the shape of the opening of the through hole 43a corresponds to the shape of the outer peripheral of any ring-shaped cross section of the sleeve column 44 using the z-direction as the normal. As shown in FIG. 4C and FIG. 4D, the opening of the through hole 43a is an ellipse, while the sleeve column 44 is an elliptic cylindroid. The optical disc drive 40 further includes at least a vertical rib 41a disposed on the base 41 but near the sleeve column 44. The sleeve column 44 has a screw hole 44a for a screw 45 to be screwed into from the opening at one end of the through hole 43a when the shock isolation structure 43 is mounted on the base 41, so that the shock isolation structure 43 can be fixed on the base 41 by the screw 45. The traverse 42 has a traverse's extension portion 42a. The traverse's extension portion 42a has an embedding aperture 46 to be embedded with the shock isolation structure 43. The optical disc drive 40 further includes a spindle motor 42b disposed on the traverse 42 for rotating an optical disc. The present embodiment is exemplified by four shock isolation structures 43, four sleeve columns 44 and four embedding apertures 46.

Figure 4E:
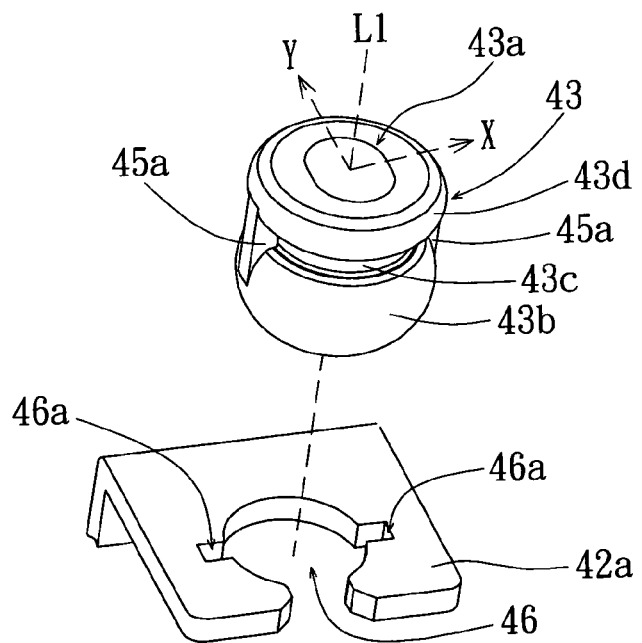
FIG. 4E is an enlarged 3-D diagram of the shock isolation structure applied in the optical disc drive and the traverse's extension portion of FIG. 4B.

As shown in FIG. 4E, the shock isolation structure 43 at least includes a bottom portion 43b, a neck portion 43c and a top portion 43d. The neck portion 43c joints the bottom portion 43b and the top portion 43d. The bottom portion 43b, the neck portion 43c and the top portion 43d have a through hole 43a. The through hole 43a runs through the top surface of the top portion 43d and the bottom surface of the bottom portion 43b along a run-through central line L1. The run-through central line L1 extends along the z-direction as shown in FIG. 4B. The neck portion 43c is embedded with the embedding aperture 46, so that the shock isolation structure 43 can moveably support the traverse 42.

Figure 4F:
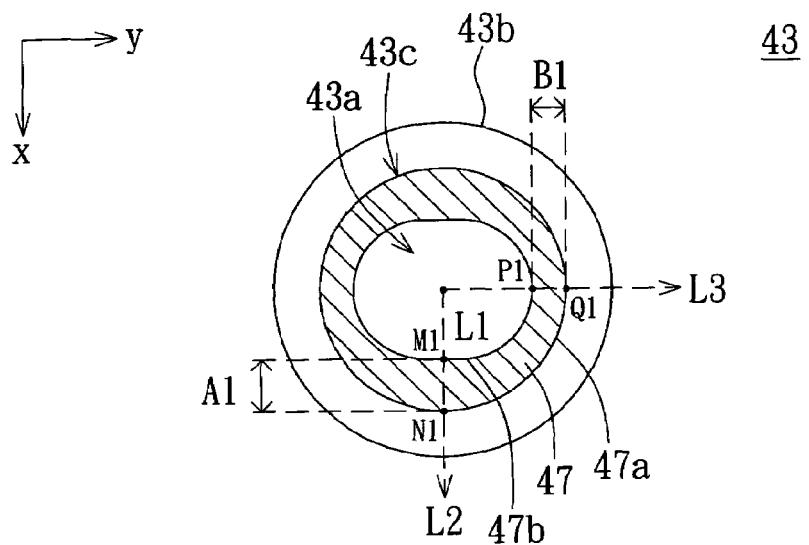
FIG. 4F is an enlarged diagram of any ring-shaped cross section of the neck portion of FIG. 4B using the z-direction as the normal.

As shown in FIG. 4F, any ring-shaped cross section 47 using the run-through central line L1 as the normal in neck portion 43c has a first wall thickness A1 on a first extension line L2 starting from the run-through central line L1 and extending towards the outer peripheral 47a of the ring-shaped cross section 47, and has a second wall thickness B1 on a second extension line L3 starting from the run-through central line L1 and extending towards the outer peripheral 47a of the ring-shaped cross section 47. The first wall thickness A1 is larger than the second wall thickness B1. Besides, the first extension line L2 is perpendicular to the second extension line L3. When the extending direction of the first extension line L2 is the x-direction, the extending direction of the second extension line L3 is the y-direction.

According to the present embodiment, the outer peripheral 47a of the ring-shaped cross section 47 forms a circle, while the inner peripheral 47b of the ring-shaped cross section 47 forms an eclipse. That is, the shape of the opening of the through hole 43a is an ellipse. The run-through central line L1 passes through the intersection between the long axis and the short axis of the eclipse and the center of the circle. The first extension line L2 and the second extension line L3 respectively overlap with the short axis and the long axis of the eclipse. The first extension line L2 respectively intersects with the eclipse and the circle at a first point M1 and a second point N1. The second extension line L3 respectively intersects with the eclipse and circle at a third point P1 and a fourth point Q1. Therefore, the distance between the first point M1 and the second point N1 is the first wall thickness A1, and the distance between the third point P1 and the fourth point Q1 is the second wall thickness B1. Besides, the wall thickness of the bottom portion 43b and the top portion 43d along the x-direction is larger than that along the y-direction.

Figure 4G:
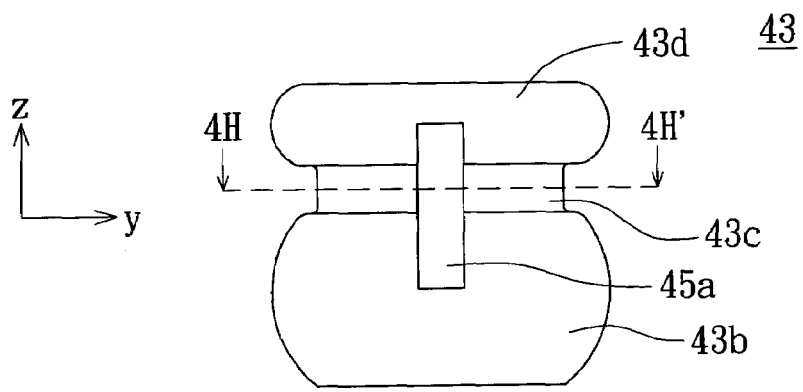
FIG. 4G is an enlarged side view of the shock isolation structure applied in the optical disc drive of FIG. 4B.

Referring to FIG. 4G, FIG. 4B and FIG. 4E at the same time. For an ordinary user or an operator who assembles the optical disc drive 40 to easily differentiate the first wall thickness A1 from the second wall thickness B1 of the shock isolation structure 43, the shock isolation structure 43 further includes at least a positioning rib 45a pointing the direction of the disposition of the shock isolation structure 43. The wall of the embedding aperture 46 has a positioning recess 46a corresponding to the positioning rib 45a. The positioning recess 46a is embedded with the positioning rib 45a. The present embodiment is exemplified by two positioning ribs 45a and two positioning recesses 46a. The two positioning ribs 45a are symmetrically disposed on part of the outer surface of the neck portion 43c along the run-through central line L1 and extend to part of the outer surfaces of the bottom portion 43b and the top portion 43d. Besides, the positioning rib 45a is symmetrically projected from outside of the neck portion 43c along the extending direction of the first extension line L2. Besides, the bottom portion 43b, the neck portion 43c, the top portion 43d and the positioning rib 45a can be an elastic structure formed in one piece.

Figure 4H:
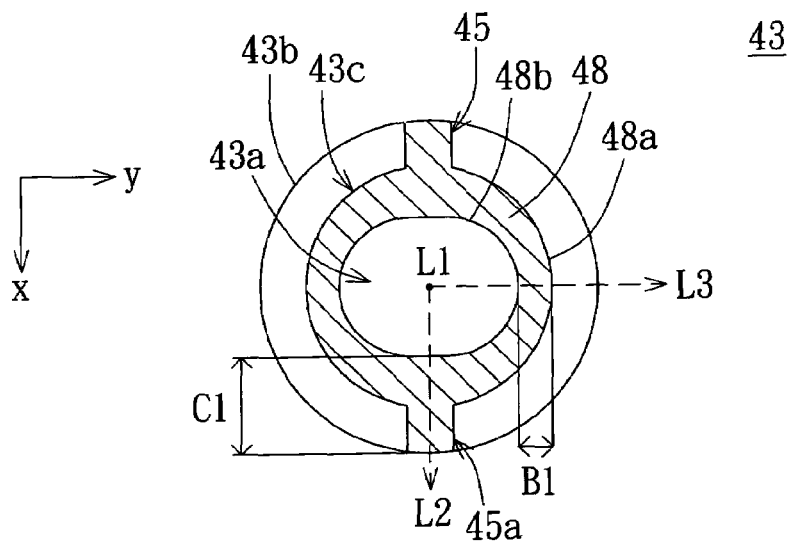
FIG. 4H is a diagram of the shock isolation structure applied in the optical disc drive viewed along cross-sectional line 4H-4H' of FIG. 4G.

As shown in FIG. 4H, in the neck portion 43c and the positioning rib 45a, any ring-shaped cross section 48 using the run-through central line L1 as the normal has a third wall thickness C1 on the first extension line L2. The third wall thickness C1 is equivalent to the sum of the thickness of the first wall thickness A1 and the positioning rib 45a, and the third wall thickness C1 is larger than the second wall thickness B1. The user or the operator, knowing that the third wall thickness C1 and the positioning rib 45a are of the same direction, would promptly align the shock isolation structure 43 to the correct direction.

Figure 5:
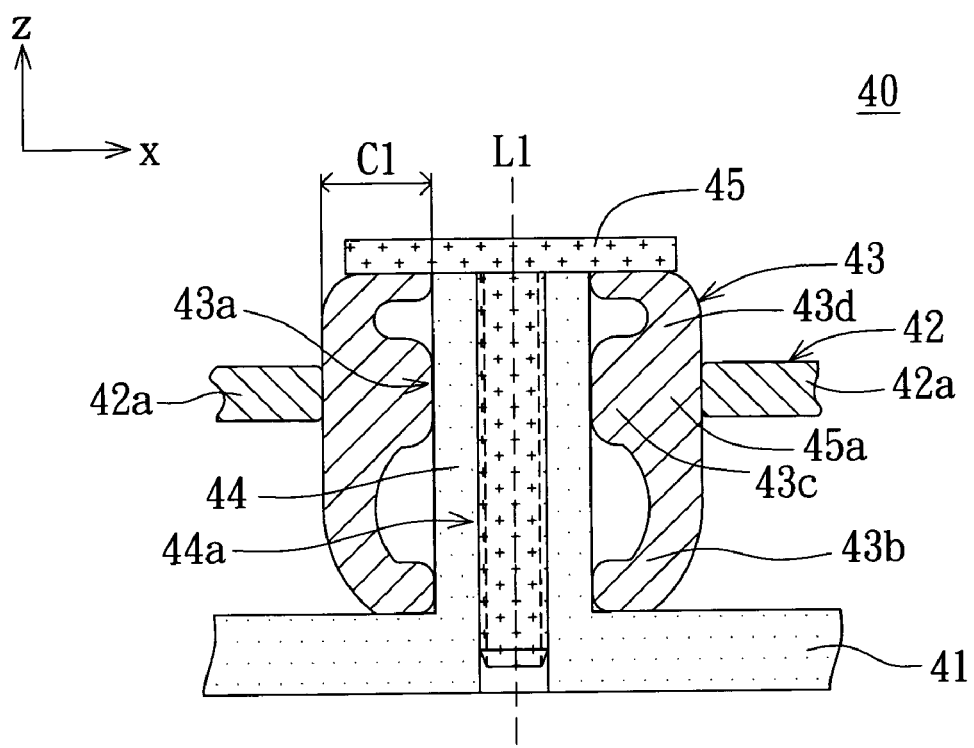
FIG. 5 is an enlarged sectional view of the assembly of the shock isolation structure applied in the optical disc drive, the sleeve column and the screw of FIG. 4A when using the xz-plane as the sectional plane and viewed from the y-direction.

As shown in FIG. 5, with the positioning rib 45a being added, the wall thickness of the neck portion 43c and the positioning rib 45a along the x-direction is larger than the wall thickness of the bottom portion 43b and the top portion 43d along the x-direction. The wall thickness of the shock isolation structure 43 along the x-direction is larger than that along the y-direction. For example, in FIG. 4H, the third wall thickness C1 of the neck portion 43c and the positioning rib 45a along the x-direction is larger than the second wall thickness B1 of the neck portion 43c along the y-direction. When the optical disc drive 40 under vertical installation using the x-direction as the gravity direction, the wall of the neck portion of the conventional shock isolation structure does not necessarily have to follow the design of an even thickness. According to the present embodiment, the wall thickness along the first direction is designed to be larger than the wall thickness along the second direction, largely enhancing the shock isolating ability of the shock isolation structure 43 against external impact.

Figure 6:
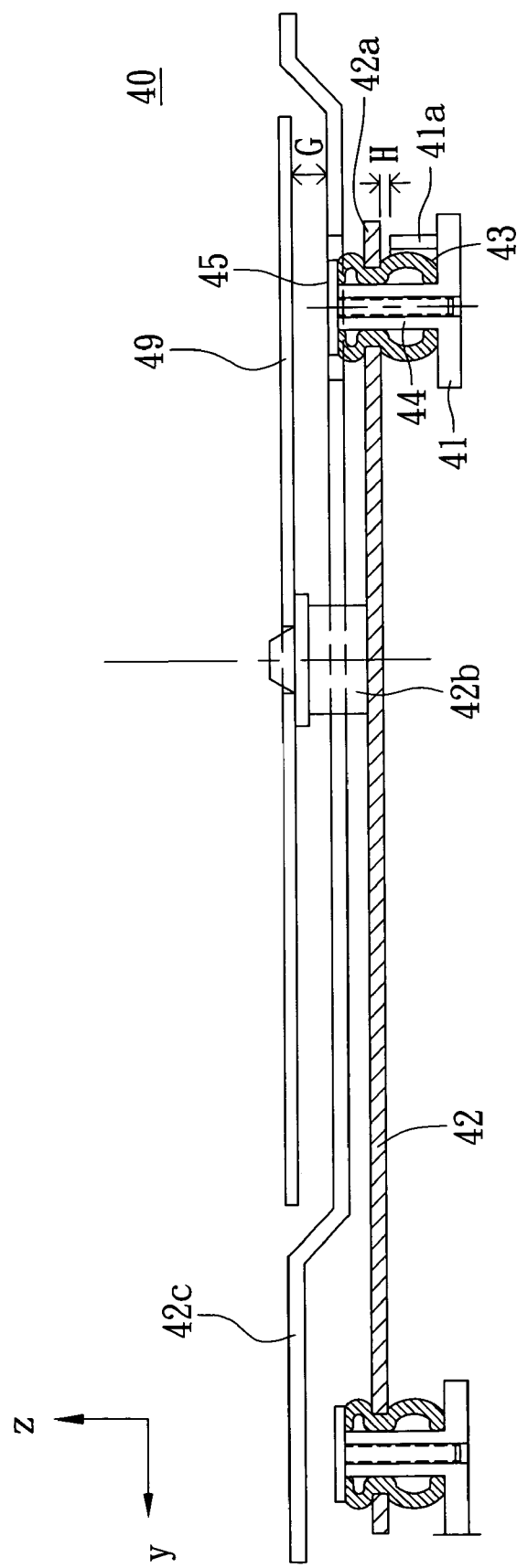
FIG. 6 is an enlarged sectional view of the assembly of the base, the traverse, the spindle motor, the shock isolation structure applied in the optical disc drive and the tray of FIG. 4A using the yz-plane as the sectional plane and viewed from the x-direction.

As shown in FIG. 6, the optical disc drive 40 further includes a tray 42c for carrying an optical disc 49 to enter or leave the optical disc drive 40. When the tray 42c carries the optical disc 49 to a retrieving position inside the optical disc drive 40, the spindle motor 42b carries and rotates the optical disc 49 for the optical disc drive 40 to retrieve data from the optical disc 19. When the spindle motor 42b carries and rotates the optical disc 49, the bearing surface of the tray 42c keeps a safety distance G from the bottom surface of the optical disc 49, while the bottom surface of the traverse 42 keeps a buffer distance H from the top surface of the vertical rib 41a. The buffer distance H must be smaller than the safety distance G. While functioning under horizontal installation, if the optical disc drive 40 receives a large external impact, the vertical rib 41a positioned under the traverse's extension portion 42a stops the movement of traverse 42 when the traverse 42 shifts towards the base 41. The maximum shift from the traverse 42, the spindle motor 42b and the optical disc 49 towards the z-direction is limited to be a buffer distance H, thus preventing the optical disc 49 from touching the tray 42c when rotated by the spindle motor 42b.

When the optical disc drive 40 under vertical installation using the x-direction as the gravity direction, the wall thickness of the shock isolation structure 43 along the x-direction is larger than that along the y-direction. Therefore, the deformation occurring to the wall with larger thickness along the x-direction can be reduced when receiving an external impact, preventing the edge of the optical disc 49 from scraping the tray 42c and the base 41 when the optical disc 49 is rotated.

Embodiment Two

Figure 7A:
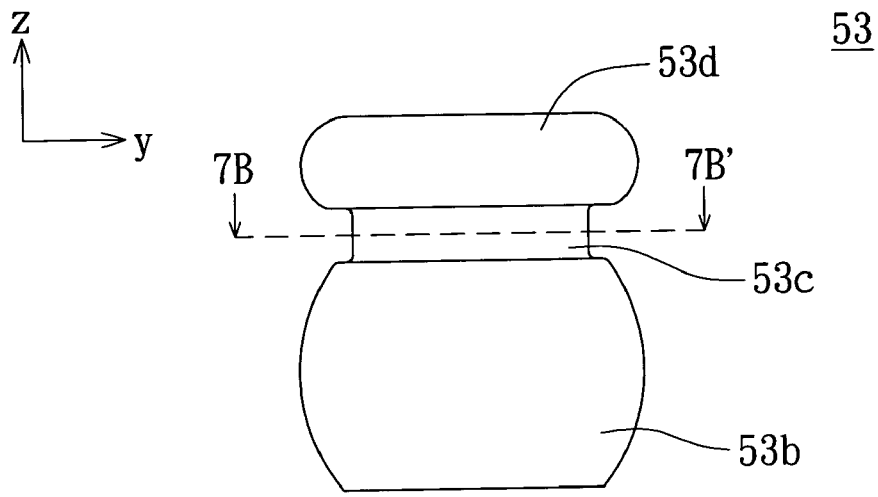
FIG. 7A is an enlarged side view of the shock isolation structure applied in an optical disc drive according to embodiment two of the invention.
Figure 7B:
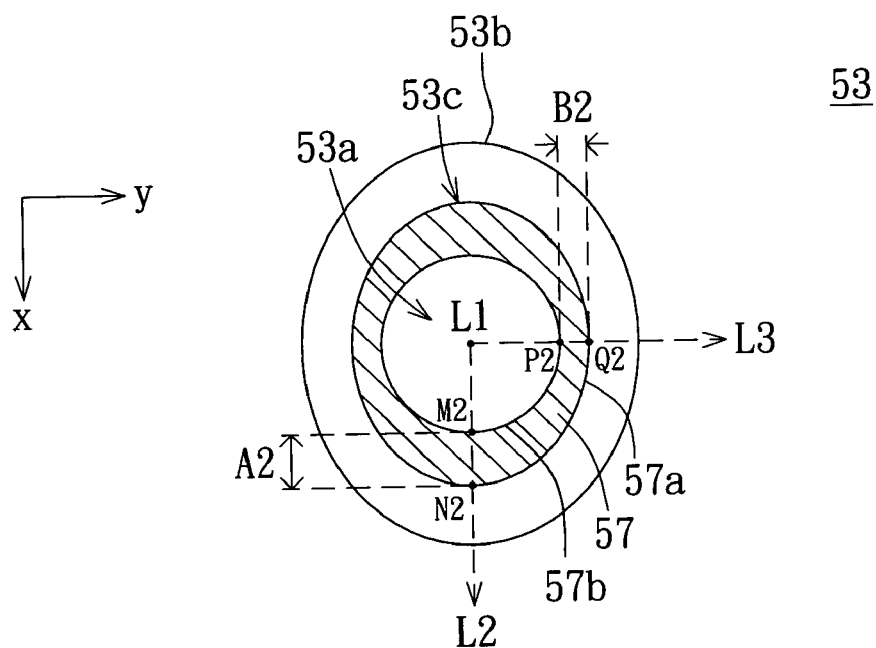
FIG. 7B is a sectional view of the shock isolation structure applied in the optical disc drive viewed along the cross-sectional line 7B-7B' of FIG. 7A.

Referring to FIG. 7A and FIG. 7B, FIG. 7A is an enlarged side view of the shock isolation structure applied in an optical disc drive according to embodiment two of the invention, while FIG. 7B is a sectional view of the shock isolation structure applied in the optical disc drive viewed along the cross-sectional line 7B-7B' of FIG. 7A. In FIG. 7A and FIG. 7B, the shock isolation structure 53 at least includes a bottom portion 53b, a neck portion 53c and a top portion 53d. The neck portion 53c joints the bottom portion 53b and the top portion 53d. The bottom portion 53b, the neck portion 53c and the top portion 53d have a through hole 53a. The through hole 53a runs through the top surface of the top portion 53d and the bottom surface of the bottom portion 53b along a run-through central line L1. The run-through central line L1 is the z-direction.

The shock isolation structure 53 according to the present embodiment differs with the shock isolation structure 43 according to embodiment one in the formation of the wall thickness along the x-direction and the y-direction. In the neck portion 53c, the outer peripheral 57a and the inner peripheral 57b of any ring-shaped cross sections 57 using the run-through central line L1 as the normal respectively form an eclipse and a circle. That is, the opening of the through hole 53a is circular. The run-through central line L1 passes through the intersection between the long axis and the short axis of the eclipse and the center of the circle. The first extension line L2, which extends from the run-through central line L1 towards the x-direction, and the second extension line L3, which extends from the run-through central line L1 towards the y-direction, respectively overlap with the long axis and the short axis of the eclipse. The first extension line L2 respectively intersects with the circle and the eclipse at a first point M2 and a second point N2. The second extension line L3 respectively intersects with the circle and the eclipse at a third point P2 and a fourth point Q2. The distance between the first point M2 and the second point N2 equals the first wall thickness A2. The distance between the third point P2 and the fourth point Q2 equals the second wall thickness B2. The first wall thickness A2 is larger than the second wall thickness B2. Besides, the wall thickness of the bottom portion 53b and the top portion 53d along the x-direction is larger than that along the y-direction.

Embodiment Three

Figure 8A:
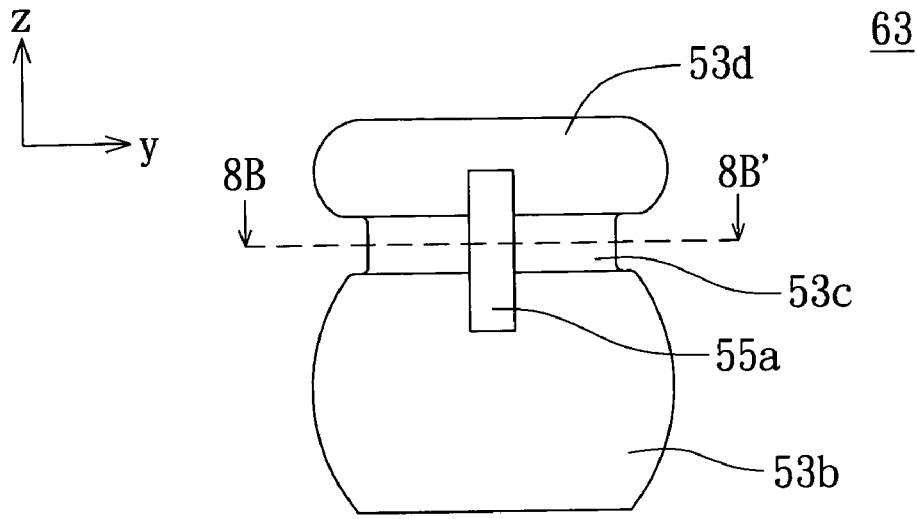
FIG. 8A is an enlarged side view of the shock isolation structure applied in an optical disc drive according to embodiment three of the invention.
Figure 8B:
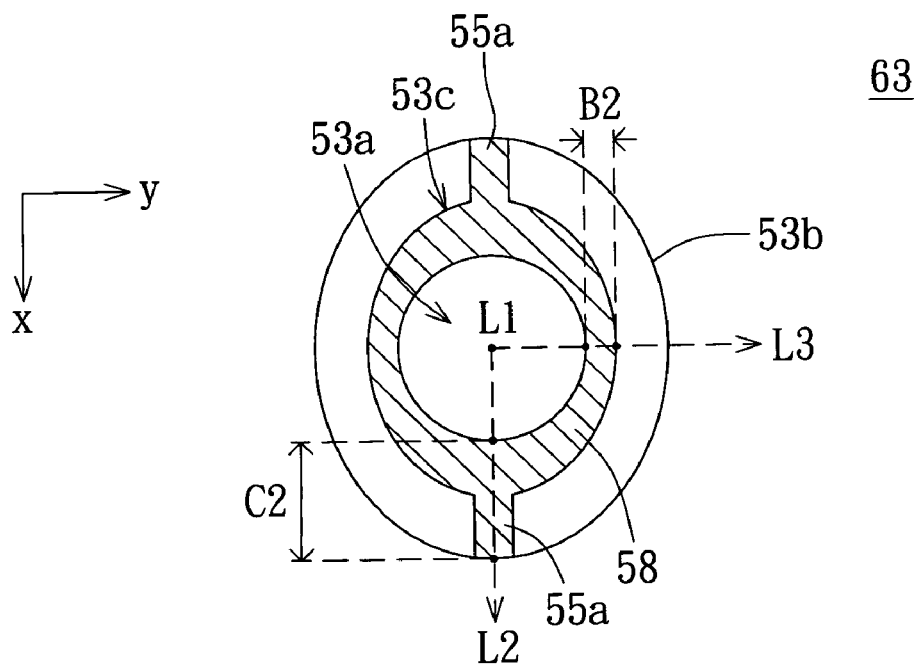
FIG. 8B is a sectional view of the shock isolation structure applied in the optical disc drive viewed along the cross-sectional line 8B-8B' of FIG. 8A.

Referring to FIG. 8A and FIG. 8B, FIG. 8A is an enlarged side view of the shock isolation structure applied in an optical disc drive according to embodiment three of the invention, while FIG. 8B is a sectional view of the shock isolation structure applied in the optical disc drive viewed along the cross-sectional line 8B-8B' of FIG. 8A. The shock isolation structure 63 according to the present embodiment has at least one more positioning rib 55a than the shock isolation structure 53 according to embodiment two. Embodiment three is exemplified by two positioning ribs 55a. In FIG. 8A and FIG. 8B, the two positioning ribs 55a are symmetrically disposed on part of the outer surface of the neck portion 53c along the run-through central line L1 and extend to part of the outer surfaces of the bottom portion 53b and the top portion 53d. Besides, the positioning rib 55a is symmetrically projected from outside neck portion 53c along the extending direction of the first extension line L2. In the neck portion 53c and the positioning rib 55a, any ring-shaped cross section 58 using the run-through central line L1 as the normal has a third wall thickness C2 on the first extension line L2. The third wall thickness C2 is equivalent to the sum of the thickness of the first wall thickness A2 and the positioning rib 55a but is larger than the second wall thickness B2.

Embodiment Four

Figure 9A:
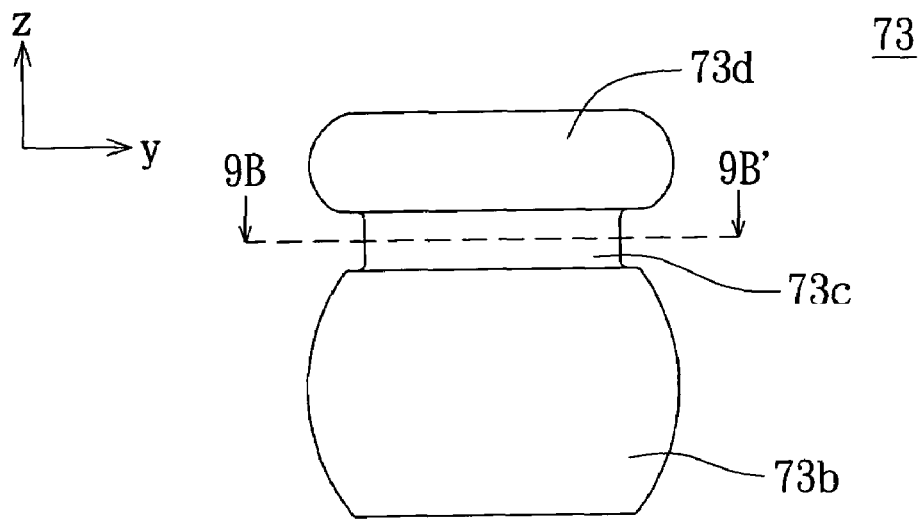
FIG. 9A is an enlarged side view of the shock isolation structure applied in an optical disc drive according to embodiment four of the invention.
Figure 9B:
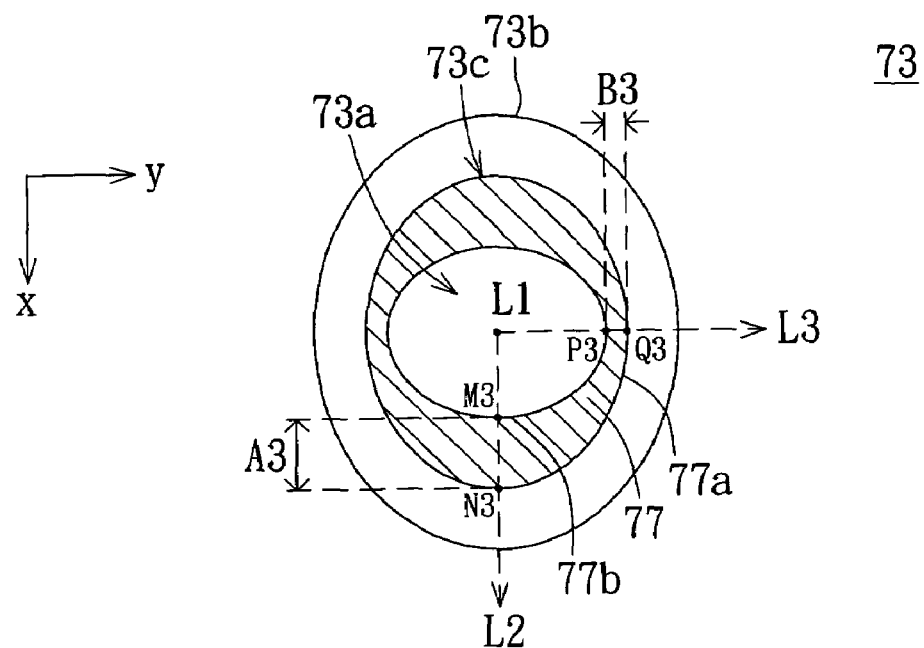
FIG. 9B is a sectional view of the shock isolation structure applied in the optical disc drive viewed along the cross-sectional line 9B-9B' of FIG. 9A.

Referring to FIG. 9A and FIG. 9B, FIG. 9A is an enlarged side view of the shock isolation structure applied in an optical disc drive according to embodiment four of the invention, while FIG. 9B is a sectional view of the shock isolation structure applied in the optical disc drive viewed along the cross-sectional line 9B-9B' of FIG. 9A. In FIG. 9A and FIG. 9B, the shock isolation structure 73 at least includes a bottom portion 73b, a neck portion 73c and a top portion 73d. The neck portion 73c joints the bottom portion 73b and the top portion 73d. The bottom portion 73b, the neck portion 73c and the top portion 73d have a through hole 73a. The through hole 73a runs through 73d the top surface of the top portion and the bottom surface of the bottom portion 73b along a run-through central line L1. The run-through central line L1 is the z-direction.

The shock isolation structure 73 according to the present embodiment differs with the shock isolation structure 43 according to embodiment one in the formation of the wall thickness along the x-direction and the y-direction. In the neck portion 73c, the outer peripheral 77a and the inner peripheral 77b of any ring-shaped cross section 77 using the run-through central line L1 as the normal respectively form a first eclipse and a second eclipse. That is, the shape of the opening of the through hole 73a is an ellipse. The run-through central line L1 passes through the intersection between the long axis and the short axis of the first eclipse and that of the second eclipse. The first extension line L2, which extends from the run-through central line L1 towards the x-direction, overlaps with the long axis of the first eclipse and the short axis of the second eclipse respectively. The second extension line L3, which extends from the run-through central line L1 towards the y-direction, overlaps with the long axis of the second eclipse and the short axis of the first eclipse respectively. The first extension line L2 respectively intersects with the second eclipse and the first eclipse at a first point M3 and a second point N3. The second extension line L3 respectively intersects with the second eclipse and the first eclipse at a third point P3 and a fourth point Q3. The distance between the first point M3 and the second point N3 equals the first wall thickness A3. The distance between the third point P3 and the fourth point 03 equals the second wall thickness B3. The first wall thickness A3 is larger than the second wall thickness B3. Besides, the wall thickness of the bottom portion 73b and the top portion 73d along the x-direction is larger than that along the y-direction.

Embodiment Five

Figure 10A:
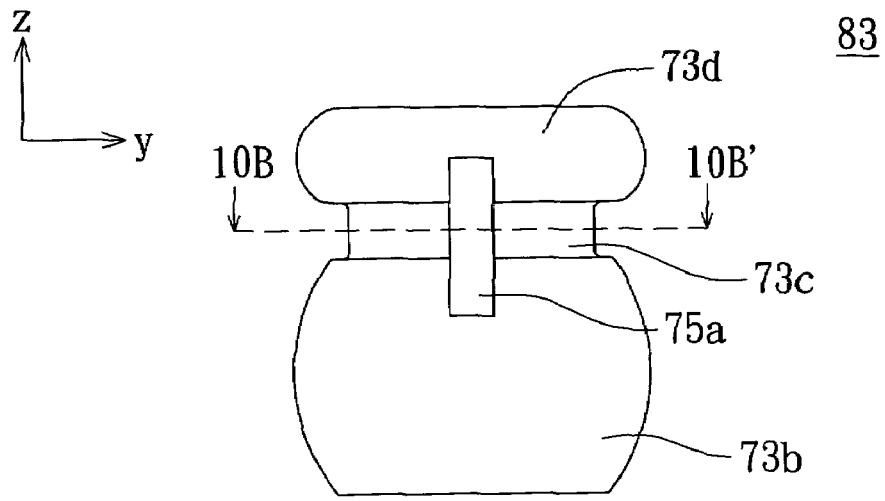
FIG. 10A is an enlarged side view of the shock isolation structure applied in an optical disc drive according to embodiment five of the invention.
Figure 10B:
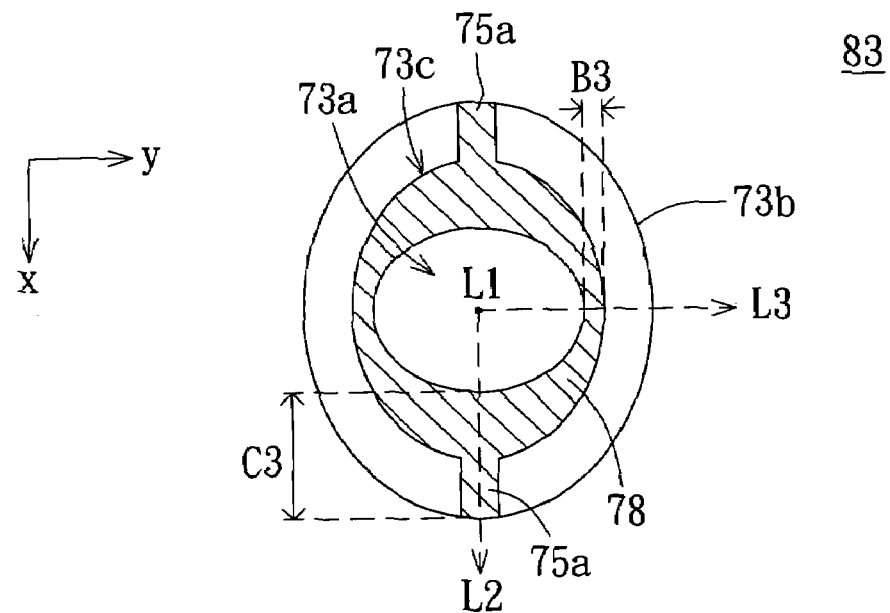
FIG. 10B is a sectional view of the shock isolation structure applied in the optical disc drive viewed along the cross-sectional line 10B-10B' of FIG. 10A.

Referring to FIG. 10A and FIG. 10B, FIG. 10A is an enlarged side view of the shock isolation structure applied in an optical disc drive according to embodiment five of the invention, while FIG. 10B is a sectional view of the shock isolation structure applied in the optical disc drive viewed along the cross-sectional line 10B-10B' of FIG. 10A. The shock isolation structure 83 according to the present embodiment has at least one more positioning rib 75a than the shock isolation structure 73 according to embodiment four. Embodiment five is exemplified by two positioning ribs 75a. In FIG. 10A and FIG. 10B, two positioning ribs 75a are symmetrically disposed on part of the outer surface of the neck portion 73c along the run-through central line L1 and extend to part of the outer surface of the bottom portion 73b and the top portion 73d. Besides, the positioning rib 75a is symmetrically projected from outside neck portion 73c along the extending direction of the first extension line L2. In the neck portion 73c and the positioning rib 75a, any ring-shaped cross section 78 using the run-through central line L1 as the normal has a third wall thickness C3 on the first extension line L2. The third wall thickness C3 is equivalent to the sum of the thickness of the first wall thickness A3 and the positioning rib 75a but is larger than the second wall thickness B3.

Embodiment Six

Figure 11A:
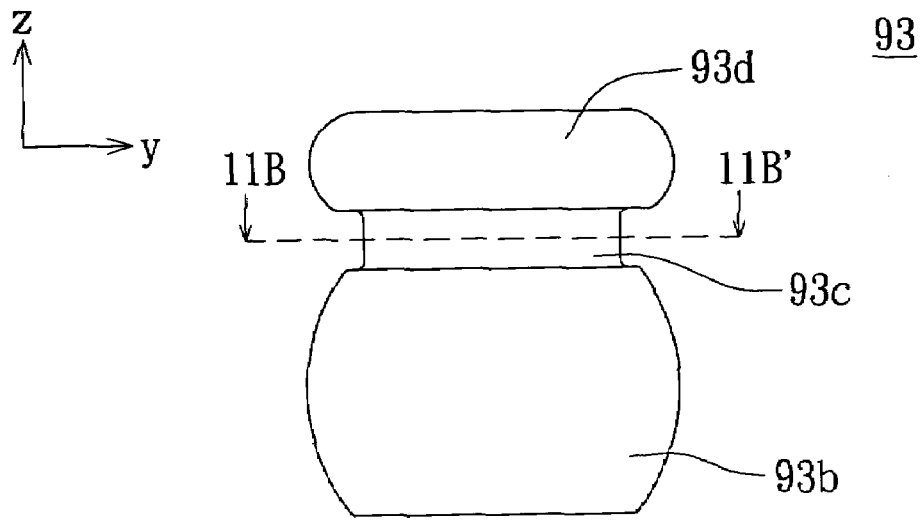
FIG. 11A is an enlarged side view of the shock isolation structure applied in an optical disc drive according to embodiment six of the invention.
Figure 11B:
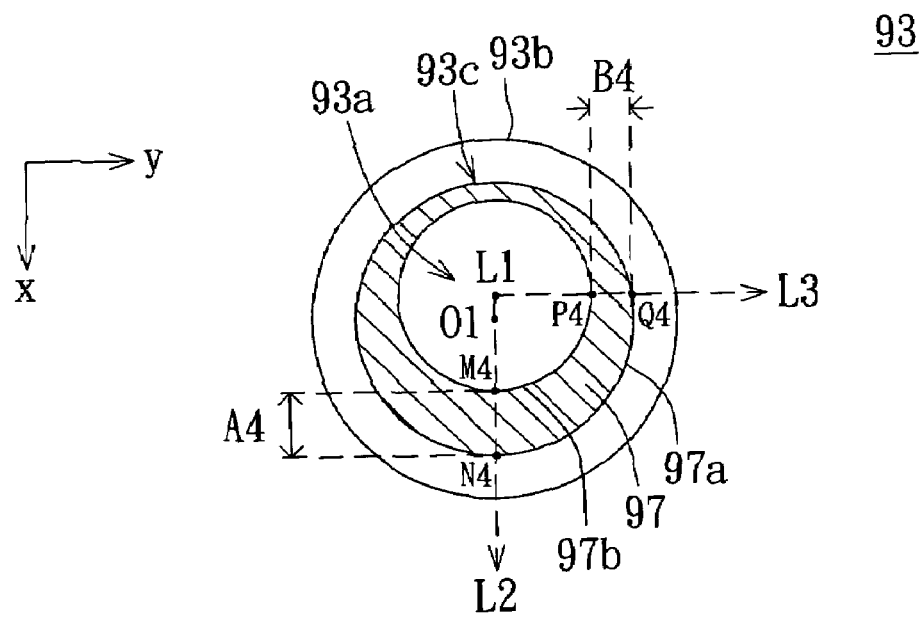
FIG. 11B is a sectional view of the shock isolation structure applied in the optical disc drive viewed along the cross-sectional line 11B-11B' of FIG. 11A.

Referring to FIG. 11A and FIG. 11B, FIG. 11A is an enlarged side view of the shock isolation structure applied in an optical disc drive according to embodiment six of the invention, while FIG. 11B is a sectional view of the shock isolation structure applied in the optical disc drive viewed along the cross-sectional line 11B-11B' of FIG. 11A. In FIG. 11A and FIG. 11B, the shock isolation structure 93 at least includes a bottom portion 93b, a neck portion 93c and a top portion 93d. The neck portion 93c joints the bottom portion 93b and the top portion 93d. The bottom portion 93b, the neck portion 93c and the top portion 93d have a through hole 93a. The through hole 93a runs through the top surface of the top portion 93d and the bottom surface of the bottom portion 93b along a run-through central line L1. The run-through central line L1 is the z-direction.

The shock isolation structure 93 according to the present embodiment differs the shock isolation structure 43 according to embodiment one in the formation of the wall thickness along the x-direction and the y-direction. In the neck portion 93c, the outer peripheral 97a and the inner peripheral of any ring-shaped cross section 97 using the run-through central line L1 as the normal respectively form a first circle and a second circle 97b. The circular center O1 of the first circle and the circular center of the second circle are inter-spaced. The run-through central line L1 passes through the circular center of the second circle. The first extension line L2, which extends from the run-through central line L1 towards the x-direction, passes through the circular center O1 of the first circle and respectively intersects with the second circle and the first circle at a first point M4 and a second point N4. The second extension line L3, which extends from the run-through central line L1 towards the y-direction, respectively intersects with the second circle and the first circle at a third point P4 and a fourth point Q4. The distance between the first point M4 and the second point N4 equals the first wall thickness A4. The distance between the third point P4 and the fourth point Q4 equals the second wall thickness B4. The first wall thickness A4 is larger than the second wall thickness B4. Besides, the wall thickness of the bottom portion 93b and the top portion 93d along the x-direction is larger than that along the y-direction.

Embodiment Seven

Figure 12A:
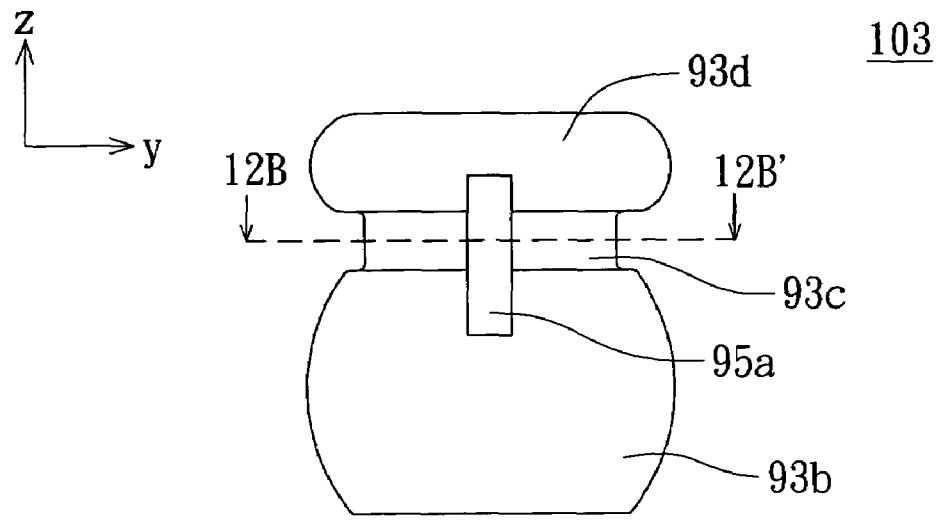
FIG. 12A is an enlarged side view of the shock isolation structure applied in an optical disc drive according to embodiment seven of the invention.
Figure 12B:
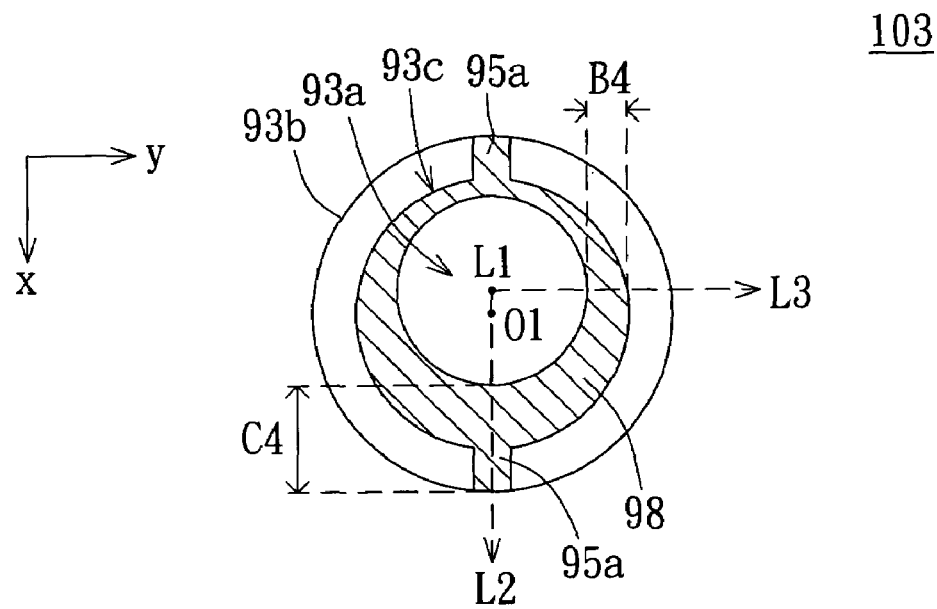
FIG. 12B is a sectional view of the shock isolation structure applied in the optical disc drive viewed along the cross-sectional line 12B-12B' of FIG. 12A.

Referring to FIG. 12A and FIG. 12B, FIG. 12A is an enlarged side view of the shock isolation structure applied in an optical disc drive according to embodiment seven of the invention, while FIG. 12B is a sectional view of the shock isolation structure applied in the optical disc drive viewed along the cross-sectional line 12B-12B' of FIG. 12A. The shock isolation structure 103 according to the present embodiment has at least one more positioning rib 95a than the shock isolation structure 93 according to embodiment six. Embodiment seven is exemplified by two positioning ribs 95a. In FIG. 12A and FIG. 12B, two positioning ribs 95a are symmetrically disposed on part of the outer surface of the neck portion 93c along the run-through central line L1 and extended to part of the outer surfaces of the bottom portion 93b and the top portion 93d. Besides, the positioning ribs 95a are symmetrically projected from outside neck portion 93c along the extending direction of the first extension line L2. In the neck portion 93c and the positioning ribs 95a, any ring-shaped cross section 98 using the run-through central line L1 as the normal has a third wall thickness C4 on the first extension line L2. The third wall thickness C4 is equivalent to the sum of the thickness of the first wall thickness A4 and the positioning rib 95a but is larger than the second wall thickness B4.

Embodiment Eight

Figure 13A:
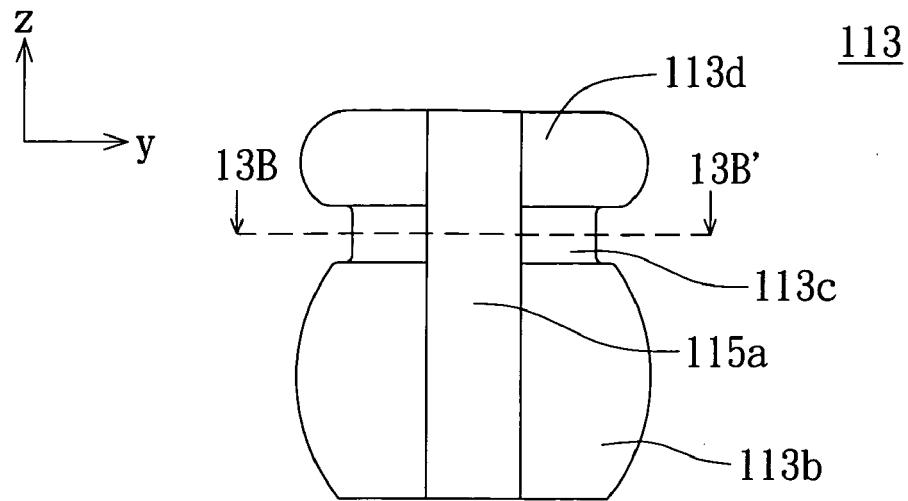
FIG. 13A is an enlarged side view of the shock isolation structure applied in an optical disc drive according to embodiment eight of the invention.
Figure 13B:
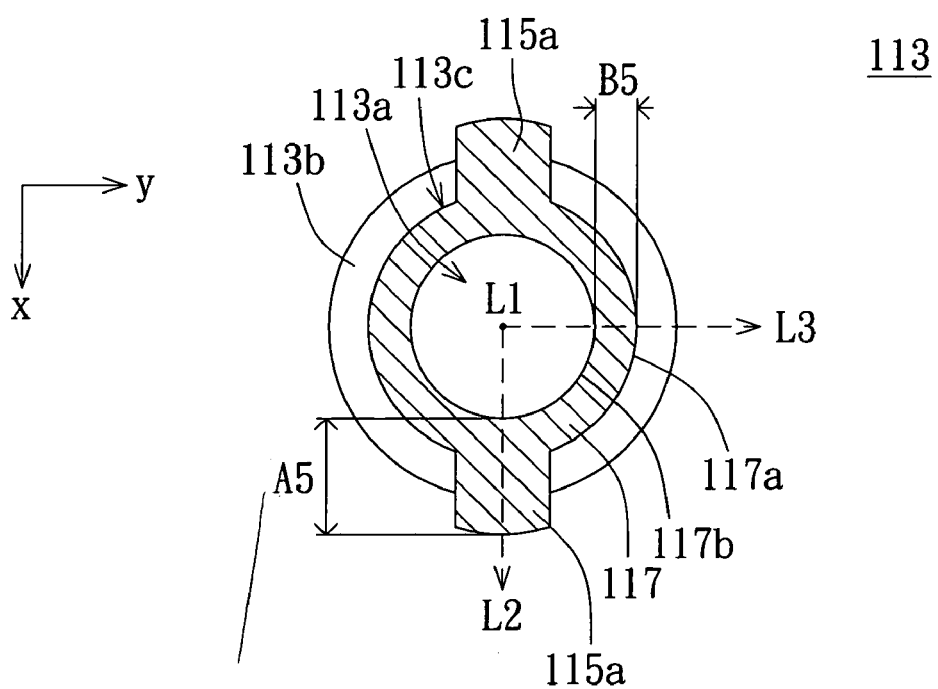
FIG. 13B is a sectional view of the shock isolation structure applied in the optical disc drive viewed along the cross-sectional line 13B-13B' of FIG. 13A.

Referring to FIG. 13A and FIG. 13B, FIG. 13A is an enlarged side view of the shock isolation structure applied in an optical disc drive according to embodiment eight of the invention, while FIG. 13B is a sectional view of the shock isolation structure applied in the optical disc drive viewed along the cross-sectional line 13B-13B' of FIG. 13A. In FIG. 13A and FIG. 13B, the shock isolation structure 113 at least includes a bottom portion 113b, a neck portion 113c, a top portion 113d and at least a positioning rib 115a. The present embodiment is exemplified by two positioning ribs 115a. The neck portion 113c joints the bottom portion 113b and the top portion 113d. The bottom portion 113b, the neck portion 113c and the top portion 113d have a through hole 113a. The through hole 113a runs through the top surface of the top portion 113d and the bottom surface of the bottom portion 113b along a run-through central line L1. The run-through central line L1 is the z-direction. The two positioning ribs 115a are symmetrically disposed on part of the outer surfaces of the bottom portion 113b, the neck portion 113c and the top portion 113d along the run-through central line L1 and extend to part of the outer surfaces of the bottom portion 113b and the top portion 113d. The top surface of the positioning rib 115a and the top surface of the top portion 113d are co-planar, and so are the bottom surface of the positioning rib 115a and the bottom surface of the bottom portion 113b co-planar.

In the neck portion 113c and the positioning rib 115a, the outer peripheral 117a and the inner peripheral 117b of any ring-shaped cross section 117 using the run-through central line L1 as the normal respectively form a first circle and a second circle. The run-through central line L1 passes through the center of the first circle and that of the second circle. The ring-shaped cross section 117 has a first wall thickness A5 the first extension line L2 starting from the run-through central line L1 and extending towards the x-direction. The positioning rib 115a is projected from outside the bottom portion 113b, the neck portion 113c and the top portion 113d along the extending direction of the first extension line L2. The ring-shaped cross section 117 has a second wall thickness B5 on the second extension line L3 starting from the run-through central line L1 and extending towards the y-direction. The first extension line L1 is perpendicular to the second extension line L2. The first wall thickness A5 is larger than the second wall thickness B5. Besides, the wall thickness of the bottom portion 113b and the top portion 113d along the x-direction is larger than that along the y-direction.

The shock isolation structure applied in an optical disc drive is disclosed in above embodiments of the invention. The wall thickness along the first direction is designed to be larger than the wall thickness along the second direction, not only reducing the deformation which would occur to the wall thickness along the first direction when receiving an external impact, but also enabling the optical disc drive under vertical installation to better isolate the external impact. The disposition of a positioning rib facilitates the user or the operator to more clearly differentiate the installation direction of the shock isolation structure when assembling the shock isolation structure in the optical disc drive. According to the change in the appearance of the shock isolation structure, when the optical disc drive is functioning under vertical installation, the lower edge of the optical disc can be prevented from touching the tray and the base without increasing any manufacturing costs. The design of having the vertical rib disposed under the extension of the traverse limits the shift from the traverse towards the base when an optical disc rotated in an optical disc drive under horizontal installation receives a large external impact, thus preventing the optical disc in rotation from touching the bearing surface of the tray. The shock isolation structure according to the invention can be applied to at least an optical disc drive under horizontal or vertical installation. The function of shock isolation can be achieved in either application.

While the invention has been described by way of example and in terms of a preferred embodiment, it is to be understood that the invention is not limited thereto. On the contrary, it is intended to cover various modifications and similar arrangements and procedures,. and the scope of the appended claims therefore should be accorded the broadest interpretation so as to encompass all such modifications and similar arrangements and procedures.

What is claimed is:

1. A shock isolation structure, comprising:
   a bottom portion and a top portion; and
   a neck portion for jointing the bottom portion and the top portion, wherein the bottom portion, the neck portion and the top portion have a through hole running through the top surface of the top portion and the bottom surface of the bottom portion along a run-through central line, and in the neck portion, any ring-shaped cross section using the run-through central line as the normal has a first wall thickness on a first extension line starting from a run-through central line and extending towards the outer curved peripheral of the ring-shaped cross section and has a second wall thickness on a second extension line starting from the run-through central line and extending towards the outer curved peripheral of the ring-shaped cross section, the first wall thickness and the second wall thickness are two different distances between the outer curved peripheral and the inner curved peripheral of the ring-shaped cross section, and the first wall thickness is larger than the second wall thickness.

2. The shock isolation structure according to claim 1, wherein the shock isolation structure is disposed between a traverse and a base, the base has a sleeve column, the sleeve column is received in the through hole, so that the shock isolation structure is mounted on the base.

3. The shock isolation structure according to claim 2, wherein the sleeve column has a screw hole for a screw to be screwed into when the shock isolation structure is mounted on the base, so that the shock isolation structure can be fixed on the base by the screw.

4. The shock isolation structure according to claim 2, wherein the traverse has an embedding aperture whose wall has a positioning recess, the embedding aperture is embedded with the neck portion, the shock isolation structure further comprises:
   a positioning rib disposed on part of the outer surface of the neck portion along the run-through central line to be embedded into the positioning recess.

5. The shock isolation structure according to claim 4, wherein the positioning rib is projected from outside part of the neck portion along the extending direction of the first extension line.

6. The shock isolation structure according to claim 1, wherein the outer curved peripheral of the ring-shaped cross section forms a first eclipse, the inner curved peripheral of the ring-shaped cross section forms a second eclipse, the run-through central line passes through intersection between the long axis and the short axis of the first eclipse and intersection between the long axis and the short axis of the second eclipse, the first extension line overlaps with the long axis of the first eclipse and the short axis of the second eclipse, the second extension line overlaps with the long axis of the second eclipse and the short axis of the first eclipse, the first extension line intersects with the second eclipse and the first eclipse at a first point and a second point, the second extension line intersects with the second eclipse and the first eclipse at a third point and a fourth point, the first wall thickness is the distance between the first point and the second point, and the second wall thickness is the distance between the third point and the fourth point.

7. The shock isolation structure according to claim 1, wherein the outer curved peripheral of the ring-shaped cross section forms a first circle, the inner curved peripheral of the ring-shaped cross section forms a second circle, the center of the first circle and the center of the second circle are interspaced, the run-through central line passes through the center of the second circle, the first extension line passes through the center of the first circle and respectively intersects with the second circle and the first circle at a first point and a second point, the second extension line is perpendicular to the first extension line and respectively intersects with the second circle and the first circle at a third point and a fourth point, the first wall thickness is the distance between the first point and the second point, and the second wall thickness is the distance between the third point and the fourth point.

8. The shock isolation structure according to claim 1, wherein the outer curved peripheral of the ring-shaped cross section forms an eclipse, the inner curved peripheral of the ring-shaped cross section forms a circle, the run-through central line passes through the intersection between the long axis and the short axis of the eclipse and the center of the circle, the first extension line and the second extension line respectively overlap with the long axis and the short axis of the eclipse, the first extension line respectively intersects with the circle and the eclipse at a first point and a second point, the second extension line respectively intersects with the circle and the eclipse at a third point and a fourth point, the first wall thickness is the distance between the first point and the second point, the second wall thickness is the distance between the third point and the fourth point, the shock isolation structure further comprises:

a positioning rib disposed on part of the outer surface of the neck portion along the run-through central line, wherein the positioning rib is projected from outside of the neck portion along the extending direction of the first extension line.

9. The shock isolation structure according to claim 1, wherein the outer curved peripheral of the ring-shaped cross section forms a circle, the inner curved peripheral of the ring-shaped cross section forms an eclipse, the run-through central line passes through the intersection between the long axis and the short axis of the eclipse and the center of the circle, the first extension line and the second extension line respectively overlap with the short axis and the long axis of the eclipse, the first extension line respectively intersects with the eclipse and the circle at a first point and a second point, the second extension line respectively intersects with the eclipse and the circle at a third point and a fourth point, the first wall thickness is the distance between the first point and the second point, and the second wall thickness is the distance between the third point and the fourth point.

10. A shock isolation structure, comprising:

a bottom portion and a top portion;

a neck portion for jointing the bottom portion and the top portion, wherein the bottom portion, the neck portion and the top portion have a through hole running through the top surface of the top portion and the bottom surface of the bottom portion along a run-through central line; and a positioning rib disposed on part of the outer surfaces of the bottom portion, the neck portion and the top portion along the run-through central line, wherein the top surface of the positioning rib and the top surface of the top portion are co-planar, and so are the bottom surface of the positioning rib and the bottom surface of the bottom portion;

wherein any ring-shaped cross section using the run-through central line as the normal in the neck portion and the positioning rib, the outer curved peripheral of the ring-shaped cross section approximates a first circle, the inner curved peripheral of the ring-shaped cross section forms a second circle, the run-through central line passes through the center of the first circle and that of the second circle, the ring-shaped cross section has a first wall thickness on a first extension line starting from the run-through central line and extending towards the outer curved peripheral of the ring-shaped cross section, the positioning rib is projected from outside the bottom portion along the extending direction of the first extension line, the neck portion and the top portion, the ring-shaped cross section has a second wall thickness on a second extension line starting from the run-through central line and extending towards the outer curved peripheral of the ring-shaped cross section, the first extension line is perpendicular to the second extension line, the first wall thickness and the second wall thickness are two different distances between the outer curved peripheral and the inner curved peripheral of the ring-shaped cross section, and the first wall thickness is larger than the second wall thickness.

11. The shock isolation structure according to claim 10, wherein the shock isolation structure is disposed between a traverse and a base, the base has a sleeve column, the sleeve column is received in the through hole, so that the shock isolation structure is mounted on the base.

12. The shock isolation structure according to claim 11, wherein the sleeve column has a screw hole for a screw to be screwed into when the shock isolation structure is mounted on the base, so that the shock isolation structure can be fixed on the base by the screw.

13. The shock isolation structure according to claim 12, wherein the traverse has an embedding aperture whose wall has a positioning recess corresponding to the positioning rib, the embedding aperture is embedded with the neck portion, and the positioning recess is embedded with the positioning rib.

14. An optical disc drive, at least comprising:

a base having a sleeve column;

a traverse having an embedding aperture; and a shock isolation structure, comprising:

a bottom portion and a top portion; and a neck portion jointing the bottom portion and the top portion, wherein the bottom portion, the neck portion and the top portion have a through hole running through the top surface of the top portion and the bottom surface of the bottom portion along a run-through central line, the through hole receives the sleeve column, the neck portion is embedded with the embedding aperture;

wherein any ring-shaped cross section using the run-through central line as the normal in the neck portion, the ring-shaped cross section has a first wall thickness on a first extension line starting from the run-through central line and extending towards the outer curved peripheral of the ring-shaped cross section, the ring-shaped cross section has a second wall thickness on a second extension line starting from the run-through central line and extending towards the outer curved peripheral of the ring-shaped cross section, the first wall thickness and the second wall thickness are two different distances between the outer curved peripheral and the inner curved peripheral of the ring-shaped cross section, and the first wall thickness is larger than the second wall thickness.

15. The optical disc drive according to claim 14, wherein the sleeve column has a screw hole for a screw to be screwed into when the shock isolation structure is mounted on the base, so that the shock isolation structure can be fixed on the base by the screw.

16. The optical disc drive according to claim 14, wherein the optical disc drive further comprises:

a tray for carrying an optical disc to enter into and leave from the optical disc drive:

a spindle motor disposed on the traverse for rotating the optical disc; and a vertical rib disposed on the base for abutting against the traverse when the traverse moves towards the base, lest the optical disc touch the tray when rotated by the spindle motor.

17. The optical disc drive according to claim 14, wherein the wall of the embedding aperture has a positioning recess, the shock isolation structure further comprises:

a positioning rib disposed on part of the outer surface of the neck portion along the run-through central line to be embedded into the positioning recess.

18. The optical disc drive according to claim 17, wherein the positioning rib is projected from outside part of the neck portion along the extending direction of the first extension line.

19. The optical disc drive according to claim 14, wherein the outer curved peripheral of the ring-shaped cross section forms a first eclipse, the inner curved peripheral of the ring-shaped cross section forms a second eclipse, the run-through central line passes through the intersection between the long axis and the short axis of the eclipse and the intersection between the long axis and the short axis of the eclipse, the first extension line overlaps with the long axis of the first eclipse and the short axis of the second eclipse, the second extension line overlaps with the long axis of the second eclipse and the short axis of the first eclipse, the first extension line intersects with the second eclipse and the first eclipse at a first point and a second point, the second extension line intersects with the second eclipse and the first eclipse at a third point and a fourth point, the first wall thickness is the distance between the first point and the second point, and the second wall thickness is the distance between the third point and the fourth point.

20. The optical disc drive according to claim 14, wherein the outer curved peripheral of the ring-shaped cross section forms a first circle, the inner curved peripheral of the ring-shaped cross section forms a second circle, the center of the first circle and the center of the second circle are inter-spaced, the run-through central line passes through the center of the second circle, the first extension line passes through the center of the first circle and respectively intersects with the second circle and the first circle at a first point and a second point, the second extension line is perpendicular to the first extension line and respectively intersects with the second circle and the first circle at a third point and a fourth point, the first wall thickness is the distance between the first point and the second point, and the second wall thickness is the distance between the third point and the fourth point.

21. The optical disc drive according to claim 14, wherein the outer curved peripheral of the ring-shaped cross section forms an eclipse, the inner curved peripheral of the ring-shaped cross section forms a circle, the run-through central line passes through the intersection between the long axis and the short axis of the eclipse and the center of the circle, the first extension line and the second extension line respectively overlap with the long axis and the short axis of the eclipse, the first extension line respectively intersects with the circle and the eclipse at a first point and a second point, the second extension line respectively intersects with the circle and the eclipse at a third point and a fourth point, the first wall thickness is the distance between the first point and the second point, the second wall thickness is the distance between the third point and the fourth point, the shock isolation structure further comprises:
   a positioning rib disposed on part of the outer surface of the neck portion along the run-through central line, wherein the positioning rib is projected from outside of the neck portion along the extending direction of the first extension line.

22. The optical disc drive according to claim 14, wherein the outer curved peripheral of the ring-shaped cross section forms a circle, the inner curved peripheral of the ring-shaped cross section forms an eclipse, the run-through central line passes through the intersection between the long axis and the short axis of the eclipse and the center of the circle, the first extension line and the second extension line respectively overlap with the short axis and the long axis of the eclipse, the first extension line respectively intersects with the eclipse and the circle at a first point and a second point, the second extension line respectively intersects with the eclipse and the circle at a third point and a fourth point, the first wall thickness is the distance between the first point and the second point, and the second wall thickness is the distance between the third point and the fourth point.

* * * * *